US008902903B2

(12) United States Patent
Palchaudhuri et al.

(10) Patent No.: US 8,902,903 B2
(45) Date of Patent: *Dec. 2, 2014

(54) ASSIGNING SLOTS IN A MESH NETWORK

(75) Inventors: Santashil Palchaudhuri, Mountain View, CA (US); Gopalakrishnan Raman, Santa Clara, CA (US)

(73) Assignee: Aruba Network, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,963

(22) Filed: Oct. 31, 2011

(65) Prior Publication Data

US 2012/0039218 A1    Feb. 16, 2012

Related U.S. Application Data

(63) Continuation of application No. 12/184,059, filed on Jul. 31, 2008, now Pat. No. 8,059,563.

(51) Int. Cl.
*H04L 12/28* (2006.01)
*D21G 9/00* (2006.01)
*D21F 3/04* (2006.01)

(52) U.S. Cl.
CPC ............... *D21G 9/0036* (2013.01); *D21F 3/04* (2013.01)
USPC ........................................ 370/395.4; 370/406

(58) Field of Classification Search
USPC .................. 370/254–256, 395.4, 400, 408, 370/449–462, 328–338, 341, 347, 436–437, 370/441–443
See application file for complete search history.

(56) References Cited

U.S. PATENT DOCUMENTS

| | | | |
|---|---|---|---|
| 2003/0220961 A1* | 11/2003 | Imai et al. ..................... | 709/200 |
| 2005/0063319 A1 | 3/2005 | Kyperountas et al. | |
| 2006/0215581 A1* | 9/2006 | Castagnoli ..................... | 370/254 |
| 2007/0133592 A1* | 6/2007 | Zheng et al. .................. | 370/458 |
| 2008/0165797 A1 | 7/2008 | Aceves | |
| 2008/0279141 A1* | 11/2008 | Luss et al. ..................... | 370/329 |
| 2009/0116444 A1* | 5/2009 | Wang et al. ................... | 370/329 |
| 2009/0245210 A1* | 10/2009 | Ariyoshi et al. .............. | 370/335 |
| 2009/0290572 A1* | 11/2009 | Gonia et al. .................. | 370/350 |
| 2011/0019608 A1* | 1/2011 | Dohler et al. ................. | 370/315 |
| 2012/0020326 A1* | 1/2012 | Zhang et al. .................. | 370/331 |
| 2012/0026970 A1* | 2/2012 | Winters et al. ................ | 370/330 |

OTHER PUBLICATIONS

U.S. Appl. No. 12/184,059, Non-Final Office Action, mailed Jun. 10, 2011.

* cited by examiner

*Primary Examiner* — Alex Skripnikov
(74) *Attorney, Agent, or Firm* — Varun A. Shah

(57) ABSTRACT

Assigning slots to nodes in a mesh network. Slot numbers are assigned to nodes in a wireless mesh network using a depth-first search combined with information on 2-hop neighborhoods for each node. Assigning slots using 2-hop neighborhood information allows slots to be safely reused. The slot assignment process may take process in parallel using different wireless channels for different subtrees rooted to a controller. Slot assignment may be repeated when the mesh topology changes. Reporting using the slot numbers allows for information from child nodes to be aggregated or filtered at parent nodes.

12 Claims, 2 Drawing Sheets

ASSIGNING SLOTS IN A MESH NETWORK

BACKGROUND OF THE INVENTION

The present invention relates to wireless systems, and in particular, to the problem of assigning reporting slots to nodes on a wireless mesh network.

Wireless networks, such as those operating according to IEEE 802.11 standards typically provide wireless packet-based data services to clients in a network. These clients may include computers such as laptops, hand-held devices such as smart phones, scanners, and the like, as well as wireless infrastructure devices such as sensors and cameras. In one common implementation, a plurality of wireless access nodes, each typically a small purpose-built computer system with one or more wireless interfaces, also includes a wired interface such as IEEE 803.2 Ethernet, to connect the access node back to a controller, which provides access to network services, as well as optionally providing functionality such as authentication, security, advanced mobility, and the like. In such a network, clients establish a wireless connection with an access node. Traffic to and from the client is passed to and from the access node wirelessly, and to and from the access node and the controller through the wired connection.

There are circumstances in which it may be difficult or expensive to run a data connection between each wireless access node and a controller. Mesh networks are useful in such circumstances. In a mesh network, rather than having each node wired to a controller, wireless access nodes establish wireless connections with each other, with only a small number of access nodes having wired access to a controller. In such a mesh network, clients also establish a wireless connection with an access node. But rather than traffic going wirelessly from client to access node, and from there by wired connection to the controller, in a mesh network, traffic first passes wirelessly from client to a first access node, and then wirelessly from that first access node through one or more other access nodes in the mesh network, until the traffic arrives at a root node or mesh portal, a wireless node which also has a wired connection to the controller, and from there to the controller. The mesh connection between access nodes may be through the same radio system and/or same radio channels as used by client traffic, or a separate radio and/or band as used by client traffic.

As is known to the art, mesh networks may be self-organizing, and adaptive, shifting their interconnections as access nodes enter and leave the network, or other characteristics of the network or its operating environment change.

It is common to represent mesh networks as a one or more trees, with each tree rooted at a root node or mesh portal. Topologically, these trees are cycle-free. Each access node forming a tree in a mesh network therefore has one parent it reports to and zero or more access nodes reporting to it as children.

In operation of a mesh network, there may be occasions where it is useful to have all access nodes report back to the controller. This may be for status, local operating parameters, or in the operation of a sensor network, reporting sensor data collected by the nodes.

To do this, nodes in the mesh network must report back, through the mesh network. One approach to doing this is to use the already existing contention resolution mechanisms in the network and let reporting from nodes be a free-for-all.

A more orderly approach assigns a reporting schedule or sequence to nodes on the mesh network. Such a schedule based access method provides for reduced latency, reduced collisions, and lowers overhead in sending and receiving of packets. This problem may be equated to "flattening" the mesh network and assigning a reporting sequence to the nodes in the mesh.

What is needed is a way to assign a reporting sequence to nodes in a wireless mesh network.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to improved methods of assigning a reporting sequence to wireless access nodes on a mesh network. In an embodiment of the invention, given one or more trees representing a mesh network, each cycle-free tree having as its root a root node or mesh portal connected to a node controller, reporting slots are assigned to nodes by having each node assess its 2-hop neighborhood to form a 2-hop neighborhood list, and ordering the nodes based on the results of a depth-first search (DFS) of the tree using the 2-hop neighborhood information, sorting the nodes based on the finish time of the DFS visit to give the post-order traversal of the nodes within a tree. For multiple trees connected to a controller, intersecting or collocated trees may choose different reporting channels, such that they do not conflict with each other, and allowing parallel transmission among nodes in different tree clusters. The slot assignment process may be repeated periodically, or on detection of events signaling a change in the topology of the mesh network, such as the loss or addition of an access node, or a change in connectivity between access nodes.

Figure 1:
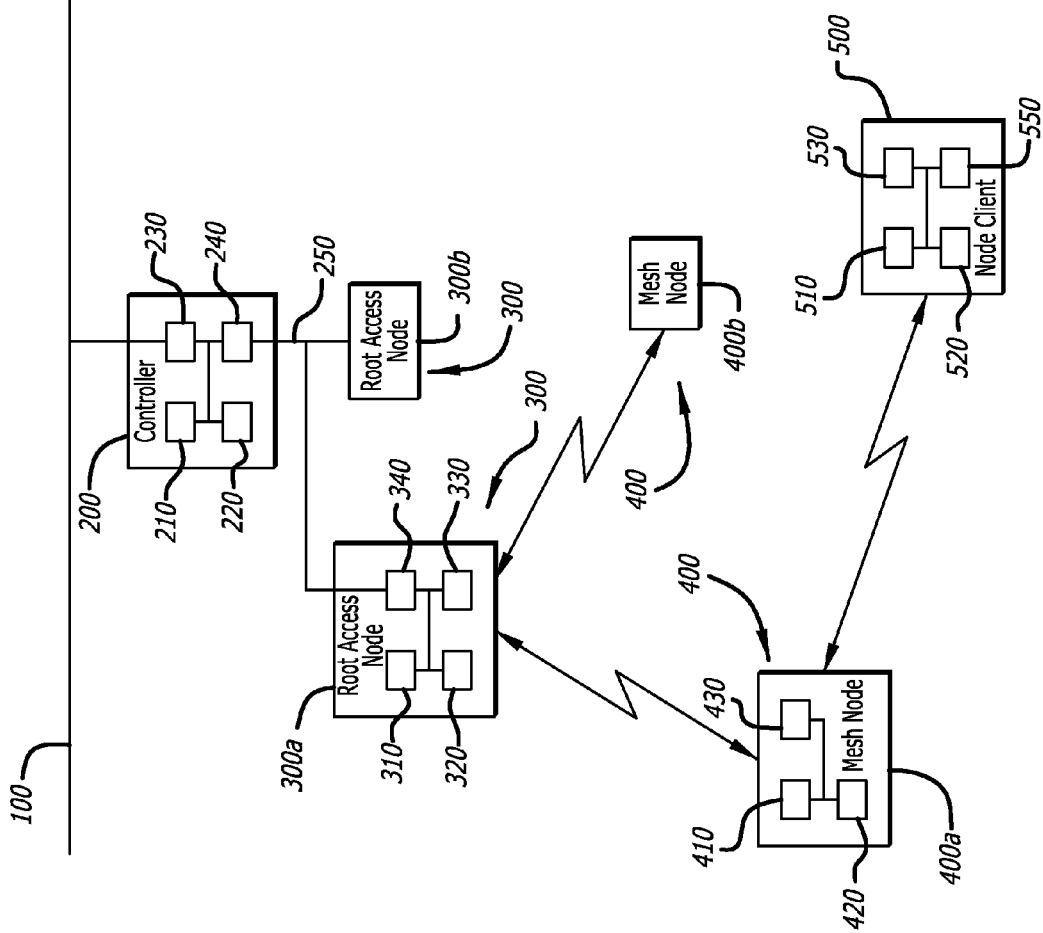
FIG. 1 shows a mesh network.

As shown in FIG. 1, network 100 such as a wired IEEE 802.3 Ethernet network is connected to controller 200. Controller 200 supports wired connections 250 to root access nodes 300a, 300b. These root access nodes provide wireless communications to mesh nodes 400a, 400b, which in turn support wireless clients such as wireless client 500.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art, wired and wireless access nodes 300a, 300b and 400a, 400b are also purpose-built digital devices. These access nodes include CPUs 310, 410, memory hierarchy 320, 420, and wireless interfaces 330, 430. Root nodes 300 include wired interface 340. While wired interface 340 may not be present in mesh nodes 400, it may be present but not used for direct communication with controller 200. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access nodes 300, 400 typically operate under control of purpose-built programs running on an embedded operating system such as Linux or VXWorks. Wireless interfaces 330, 430 are typically interfaces operating to the family of IEEE 802.11 standards including but not limited to 802.11a, b, g, and/or n.

Wireless client 500 is also a digital device, similarly having CPU 510, memory hierarchy 520, wireless interface 530, and I/O devices 550. As examples, wireless device 500 may be a general purpose computer such as a laptop, or may be a purpose-built device such as a Wi-Fi phone or a handheld scanner. In a general-purpose computer, CPU 510 may be a processor from companies such as Intel, AMD, Freescale, or the like. In the case of purpose-built devices, Acorn or MIPS class processors may be preferred. Memory hierarchy 520 comprises the similar set of read-only memory for device startup and initialization, fast read-write memory for device operation and holding programs and data during execution, and permanent bulk file storage using devices such as flash, compact flash, and/or hard disks. Additional I/O devices 550 may be present, such as keyboards, displays, speakers, barcode scanners, and the like.

When operating in a mesh environment, client 500 establishes a connection with a mesh node 400. Traffic from client 500 goes initially to the mesh node 400 it had established the connection with, and from that mesh node, through other mesh nodes back to root node 300, and through controller 200 to network 100.

According to an embodiment of the invention, nodes are enumerated, assigning slots to nodes in the mesh network through the following process, in which each node knows its parent, its children, and its 2-hop neighborhood, and starting with the root node:

While all children not visited do
  1. Send token to a child node not visited
  2. Wait until the token comes back
  3. Remember the slot allocation of each child When all nodes in the subtree rooted at the node have been visited, assign a possible slot number s with the following constraints:
  1. s> maximum slot number allocated to any of its children and
  2. s≠ slot number already allocated to a node in its 2-hop neighborhood.

Append the node id and the slot number chosen to the token, and return the token to the parent.

As will be appreciated by those familiar with the art, this process enumerates nodes using a depth-first search (DFS) of the tree, but based on the 2-hop neighborhood information.

Figure 2:
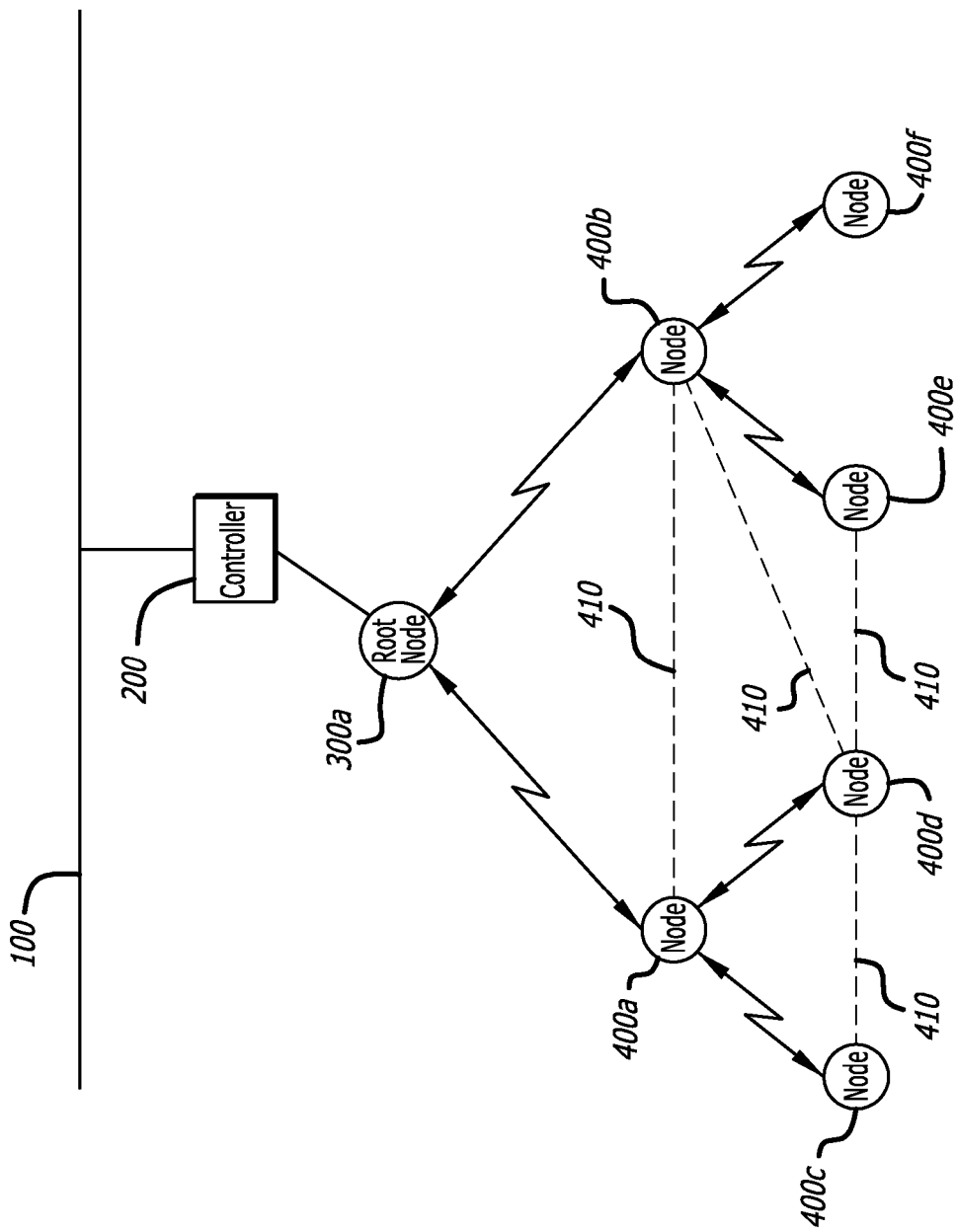
FIG. 2 shows a mesh network.

Referring to the mesh network of FIG. 2, the process begins with nodes 400 assessing their 2-hop neighborhoods. This is achieved, for example, by each node 400 sending a broadcast packet with a TTL of 2, and collecting all such broadcast packets the node receives as a list of 2-hop neighbors. Nodes on such lists are identified by some unique identifier, such as MAC address, although other unique identifiers may be used such as node serial numbers or the like. This list of 2-hop neighbors is different from the tree topology of the mesh network; rather, it represents a list of nodes that are in RF proximity to a node. According to the present invention, slot assignment takes advantage of the assumption that if a node is not on a target node's 2-hop list, then both nodes may transmit at the same time on the same frequency without interfering with each other.

According to the present invention, root node 300*a* generates a token packet and passes it around in DFS order. The node holding the token allocates a slot for itself using its 2-hop neighborhood when the token returns to it after traversing all of its children. The node identifier and allocated slot is put in the token, and hence the token contains the allocated slots of all the nodes it has traversed. Choosing the next child in the DFS is based on the degree of the children. The higher the degree of the child, the earlier it gets the token, thereby leading to allocation of earlier slots in dense areas compared to less dense areas of the tree.

Referring again to FIG. 2, dotted lines 410 indicate nodes which share a 2-hop neighborhood. In this case, nodes 400*c*, 400*d*, and 400*e* share the same 2-hop neighborhood, and nodes 400*b*, 400*a*, and 400*d* share the same 2-hop neighborhood.

Slots are assigned by root node 300 starting the process by sending an empty token to its first child, node 400*a*. This is accomplished by sending a wireless packet from root node 300*a* to mesh node 400*a*. Node 400*a* receives the token, and passes it to its child, node 400*c*.

Node 400*c*, having no children, selects a slot number according to the process previously detailed. Since the token is empty, node 400*c* chooses an initial slot value, for example, 1. It appends a tuple to the packet containing its identification, which may be its MAC, serial number, or other unique identifier, together with the slot number it has chosen, and returns this packet to its parent, node 400*a*, by sending the token wirelessly to node 400*a*.

Node 400*a* receives the token and sends it to child node 400*d*. Node 400*d* selects a slot number which is greater than the maximum slot number allocated to any child, and not already allocated by a node in its 2-hop neighborhood. Slot number 2 meets these criteria. Node 400*d* appends a tuple containing its ID and the slot number 2 to the token and returns it to its parent, 400*a*.

Parent node 400*a* now applies the same selection rules and picks slot number 3, appending a tuple with its ID and slot number 3 to the token and passing it back to its parent, 300*a*.

Node 300*a* sends the token to node 400*b*, which sends it to child node 400*e*. Node 400*e* chooses slot number 4, appending a tuple with its ID and slot number 4 to the token and returning it to its parent, 400*b*. Node 400*b* now sends the token to child 400*f*.

According to the present invention, since node 400*f* does not have any children, and the token does not contain any nodes which are in its 2-hop neighborhood, node 400*f* chooses slot number 1. While node 400*c* also chose slot 1, because nodes 400*c* and 400*f* are not in the same 2-hop neighborhood, both nodes can transmit at the same time, using slot 1, without risk of interference. Thus slot 1 may be reused. Node 400*f* appends a tuple with its ID and slot number 1 to the token and returns it to its parent, 400*b*.

Under the process given, node 400*b* takes as its slot number a number greater than any slot number allocated to any of its children, and not equal to a slot number allocated to a node in its 2-hop neighborhood. Slot number 5 meets both these criteria. Node 400*b* appends a tuple with its ID and slot number 5 to the token and returns it to its parent, node 300*a*, and the enumeration and slot assignment is complete.

Note that by allocating slots using the process detailed, relying on 2-hop neighborhoods to eliminate conflicts, slots may be reused safely.

Once nodes have been enumerated and assigned slots, these slot assignments may be used in reporting information back to controller 200.

According to an aspect of the invention, when controller 200 requests a status update through root node 300*a*, for example by broadcasting a request to report status beginning at a specified time, nodes in that tree report status in enumerated slot order. As all child nodes report back to the parent node before the parent node reports back to its parent, aggregation of information from child nodes is possible. This allows parent nodes to analyze, filter, summarize, and/or compress data from children as part of the aggregation process.

In aggregating status information, a parent node for example concatenates the status information reported by its children, concatenates its own status information, and passes this aggregated status to its parent node.

Filtering or other processing may also occur during this process. As an example, in reporting minimum and maximum node temperatures over the mesh network, each node reports to its parent the minimum and maximum temperatures for itself and its children. As the slot ordering establishes that each parent node receives status from its children before it sends its status to its parent, each parent node can aggregate these minimum and maximum temperatures over its children and itself. Similarly, if controller 200 is polling for error conditions, rather than having to process a multitude of "no error" messages from mesh nodes, aggregation by parent nodes allows only error reports to be propagated back to root node 300 and controller 200.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A system comprising:
   at least one device comprising a hardware processor;
   the system being configured to perform operations comprising:
   selecting, for each mesh node of a plurality of mesh nodes, a respective time period from a set of time periods to (a) wirelessly transmit data to another mesh node on a communication path toward a mesh portal or (b) wirelessly transmit data directly to the mesh portal;
   wherein a child mesh node, of any particular mesh node in the plurality of mesh nodes, is a mesh node that is communicatively coupled with the mesh portal at least through the particular mesh node;
   wherein the mesh portal is a mesh node with a wired connection to a wired network;
   wherein the respective time period selected for each mesh node, with one or more child mesh nodes, is selected after the respective time periods for all the child mesh nodes of that mesh node has been selected.

2. The system of claim 1, wherein selecting the respective time period for each mesh node comprises selecting a first available time period in the set of time periods when the selection of the respective time period for that mesh node is made.

3. The system of claim 2, wherein the first available time period for a particular mesh node is an earliest time period in the set of time periods for using a particular frequency channel to be used by the particular mesh node that has not been selected for any other mesh nodes that are within a radio frequency (RF) interference range from the particular mesh node.

4. The system of claim 1, wherein selecting the respective time period for each mesh node of the plurality of mesh nodes comprises: selecting a time period for that mesh node that is later than a time period selected for any child mesh node of that mesh node.

5. The system of claim 1, wherein selecting the respective time period for each mesh node of the plurality of mesh nodes comprises: selecting a time period for that mesh node that is different than a time period, for using a particular frequency channel to be used by that mesh node, already selected for any other mesh node within a 2-hop distance from that mesh node.

6. A non-transitory computer readable medium comprising instructions which, when executed by one or more hardware processors, causes performance of operations comprising:
   selecting, for each mesh node of a plurality of mesh nodes, a respective time period from a set of time periods to (a) wirelessly transmit data to another mesh node on a communication path toward a mesh portal or (b) wirelessly transmit data directly to the mesh portal;
   wherein a child mesh node, of any particular mesh node in the plurality of mesh nodes, is a mesh node that is communicatively coupled with the mesh portal at least through the particular mesh node;
   wherein the mesh portal is a mesh node with a wired connection to a wired network;
   wherein the respective time period selected for each mesh node, with one or more child mesh nodes, is selected after the respective time periods for all the child mesh nodes of that mesh node has been selected.

7. The medium of claim 6, wherein selecting the respective time period for each mesh node comprises selecting a first available time period in the set of time periods when the selection of the respective time period for that mesh node is made.

8. The medium of claim 6, wherein the first available time period for a particular mesh node is an earliest time period in the set of time periods for using a particular frequency channel to be used by the particular mesh node that has not been selected for any other mesh nodes that are within an radio frequency (RF) interference range from the particular mesh node.

9. The medium of claim 6, wherein selecting the respective time period for each mesh node of the plurality of mesh nodes comprises: selecting a time period for that mesh node that is later than a time period selected for any child mesh node of that mesh node.

10. The medium of claim 6, wherein selecting the respective time period for each mesh node of the plurality of mesh nodes comprises: selecting a time period for that mesh node that is different than a time period, for using a particular frequency channel to be used by that mesh node, already selected for any other mesh node within a 2-hop distance from that mesh node.

11. A non-transitory computer readable medium comprising instructions which, when executed by one or more hardware processors, causes performance of operations comprising:
    selecting, for each mesh node of a plurality of mesh nodes, a respective time period from a set of time periods to (a) wirelessly transmit data to another mesh node on a communication path toward a mesh portal or (b) wirelessly transmit data directly to the mesh portal;
    wherein a child mesh node, of any particular mesh node in the plurality of mesh nodes, is a mesh node that is communicatively coupled with the mesh portal at least through the particular mesh node;

wherein the mesh portal is a mesh node with a wired connection to a wired network;

wherein the respective time period selected for each mesh node with one or more child mesh nodes is a time period that is chronologically subsequent, in the set of time periods, to the respective time periods selected for all the child mesh nodes of that mesh node.

12. A system comprising:

at least one device comprising a hardware processor;

the system being configured to perform operations comprising:

selecting, for each mesh node of a plurality of mesh nodes, a respective time period from a set of time periods to (a) wirelessly transmit data to another mesh node on a communication path toward a mesh portal or (b) wirelessly transmit data directly to the mesh portal;

wherein a child mesh node, of any particular mesh node in the plurality of mesh nodes, is a mesh node that is communicatively coupled with the mesh portal at least through the particular mesh node;

wherein the mesh portal is a mesh node with a wired connection to a wired network;

wherein the respective time period selected for each mesh node with one or more child mesh nodes is a time period that is chronologically subsequent, in the set of time periods, to the respective time periods selected for all the child mesh nodes of that mesh node.

\* \* \* \* \*